(12) United States Patent
Krishnamurthi

(10) Patent No.: US 8,548,487 B2
(45) Date of Patent: Oct. 1, 2013

(54) SIGNALING FOR ADMINISTRATIVE DOMAIN CHANGE DURING LOCATION TRACKING

(75) Inventor: Govindarajan Krishnamurthi, San Diego, CA (US)

(73) Assignee: Nokia Corporation, Espoo (FI)

(*) Notice: Subject to any disclaimer, the term of this patent is extended or adjusted under 35 U.S.C. 154(b) by 1596 days.

(21) Appl. No.: 11/245,614

(22) Filed: Oct. 7, 2005

(65) Prior Publication Data

US 2006/0274696 A1    Dec. 7, 2006

Related U.S. Application Data

(60) Provisional application No. 60/688,205, filed on Jun. 7, 2005.

(51) Int. Cl.
*H04W 24/00* (2009.01)

(52) U.S. Cl.
USPC ..... 455/456.1; 455/436; 455/433; 455/404.2; 455/435.1; 455/421

(58) Field of Classification Search
USPC ............... 455/433, 453, 456.1, 456, 404.2, 455/421; 342/357.06
See application file for complete search history.

(56) References Cited

U.S. PATENT DOCUMENTS 6,768,909 B1 * 7/2004 Irvin ......................... 455/456.1
6,859,448 B1   2/2005 Roy 2002/0018476 A1    2/2002 Roy
2003/0103496 A1    6/2003 Narayanan et al.
2003/0210666 A1   11/2003 Trossen et al.
2006/0052115 A1 * 3/2006 Khushu ..................... 455/456.3

FOREIGN PATENT DOCUMENTS

EP            1708423 A1    10/2006
WO  PCT/IB2006/001724     11/2006

OTHER PUBLICATIONS

Terry Jacobson, Periodic Position Reporting—Recovery from PDE Failure, Feb. 14, 2005, 3GPP2 Lucent Technologies, X20-20050214.*
TeleMIP: Telecommunications-Enhanced Mobile IP Architecture for Fast Intradomain Mobility Pub:IEEE Personnals IEEE Communications Society, US, XP011092403, Subir Das et al., vol. 7, nr.4,p. 50-58.
ICC 2002.2002 IEEE Intef Jference on Communications. Conference Proceedings. New York, NY, Apr. 28-May 2, 2002, IEEE International Conference on Communications, New York, NY: IEEE, US. PD-2002-04-28, Morand L et al. AN XP010589851, sections IV-VI.

* cited by examiner

*Primary Examiner* — Vladimir Magloire
(74) *Attorney, Agent, or Firm* — Ditthavong Mori & Steiner, P.C.

(57) ABSTRACT

An approach provides signaling for administrative domain change during location tracking. Departure of a mobile node from a first administrative domain is detected during a position reporting session. It is determined whether a first, configured to determine position, within the first administrative domain is inaccessible. If inaccessible, signaling for a handoff is initiated for assignment of a second, configured to determine position, within a second administrative domain to continue the position reporting session.

59 Claims, 11 Drawing Sheets

US 8,548,487 B2

SIGNALING FOR ADMINISTRATIVE DOMAIN CHANGE DURING LOCATION TRACKING

RELATED APPLICATIONS

This application is related to, and claims the benefit of the earlier filing date under 35 U.S.C. §119(e) of, U.S. Provisional Patent Application (Ser. No. 60/688,205), filed Jun. 7, 2005, entitled "Signaling for Administrative Domain Change During Periodic Tracking"; the entirety of which are incorporated herein by reference.

FIELD OF THE INVENTION

Various exemplary embodiments of the invention relate generally to communications, and more particularly to tracking of mobile nodes.

BACKGROUND OF THE INVENTION

Radio communication systems, such as cellular systems (e.g., spread spectrum systems (such as Code Division Multiple Access (CDMA) networks), or Time Division Multiple Access (TDMA) networks), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One key area of effort involves determining location of a mobile user, particularly during roaming. Unfortunately, this location function is not effectively supported by current protocols.

Therefore, there is a need for an approach to address roaming of mobile users among different administrative domains.

SUMMARY OF THE INVENTION

These and other needs are addressed by various embodiments of the invention, in which an approach provides signaling for administrative domain change during location tracking.

According to one aspect of an embodiment of the invention, a method comprises detecting departure from a first administrative domain during a position reporting session. The method also comprises determining whether a first entity, configured to determine position, within the first administrative domain is inaccessible. Further, if inaccessible, the method comprises initiating signaling for a handoff for assignment of a second entity, configured to determine position, within a second administrative domain to continue the position reporting session.

According to another aspect of an embodiment of the invention, an apparatus comprises a processor configured to detect departure from a first administrative domain during a position reporting session, and to determine whether a first entity, configured to determine position, within the first administrative domain is inaccessible. The apparatus also comprises a radio section coupled to the processor and configured to initiate signaling for a handoff for assignment of a second entity if the first entity is inaccessible, wherein the second entity is configured to determine position, within a second administrative domain to continue the position reporting session.

According to another aspect of an embodiment of the invention, a method comprises receiving a message, from a mobile node, specifying information corresponding to a tracking session, upon the mobile node entering a new administrative domain from another administrative domain. Also, the method comprises identifying a new serving position server within the new administrative domain for serving the mobile node. Further, the method comprises assigning a new position determining entity (PDE) within the new administrative domain for continuing the session in the new administrative domain.

According to another aspect of an embodiment of the invention, an apparatus comprises a communication interface configured to receive a message, from a mobile node, specifying information corresponding to a tracking session, upon the mobile node entering a new administrative domain from another administrative domain. The apparatus also comprises a processor coupled to the communication interface and configured to identify a new serving position server within the new administrative domain for serving the mobile node, the processor being further configured to assign a new position determining entity (PDE) within the new administrative domain for continuing the session in the new administrative domain.

According to another aspect of an embodiment of the invention, an apparatus comprises means for detecting departure from a first administrative domain during a position reporting session. The apparatus also comprises means for determining whether a first entity, configured to determine position, within the first administrative domain is inaccessible. Further, the apparatus comprises means for, if inaccessible, initiating signaling for a handoff for assignment of a second entity, configured to determine position, within a second administrative domain to continue the position reporting session.

According to another aspect of an embodiment of the invention, an apparatus comprises means for receiving a message, from a mobile node, specifying information corresponding to a tracking session, upon the mobile node entering a new administrative domain from another administrative domain. The apparatus also comprises means for identifying a new serving position server within the new administrative domain for serving the mobile node. Further, the apparatus comprises means for assigning a new position determining entity (PDE) within the new administrative domain for continuing the session in the new administrative domain.

According to yet another aspect of an embodiment of the invention, a system comprises a node configured to receive a message, from a mobile node, specifying information corresponding to a tracking session, upon the mobile node entering a new administrative domain from another administrative domain. The system also comprises a position determining entity (PDE) configured to determine location of the mobile node within the other administrative domain and to communicate with the node. Further, the node is further configured to identify a new serving position server within the new administrative domain for serving the mobile node, and to assign a new position determining entity (PDE) within the new administrative domain for continuing the session in the new administrative domain.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The invention is illustrated by way of example, and not by way of limitation, in the figures of the accompanying drawings and in which like reference numerals refer to similar elements and in which.

DESCRIPTION OF THE PREFERRED EMBODIMENT

An apparatus, method, and software for signaling to process administrative domain change during location tracking in a radio communication network are described. In the following description, for the purposes of explanation, numerous specific details are set forth in order to provide a thorough understanding of the invention. It is apparent, however, to one skilled in the art that the invention may be practiced without these specific details or with an equivalent arrangement. In other instances, well-known structures and devices are shown in block diagram form in order to avoid unnecessarily obscuring the invention.

Although the invention is discussed with respect to a radio communication network (such as a cellular system), it is recognized by one of ordinary skill in the art that the invention has applicability to any type of communication system, including terrestrial systems. Additionally, the various embodiments of the invention are described with respect to Internet Protocol (IP)-based location services; however, it is contemplated that these embodiments are applicable to other communication protocols and architectures.

Figure 1:
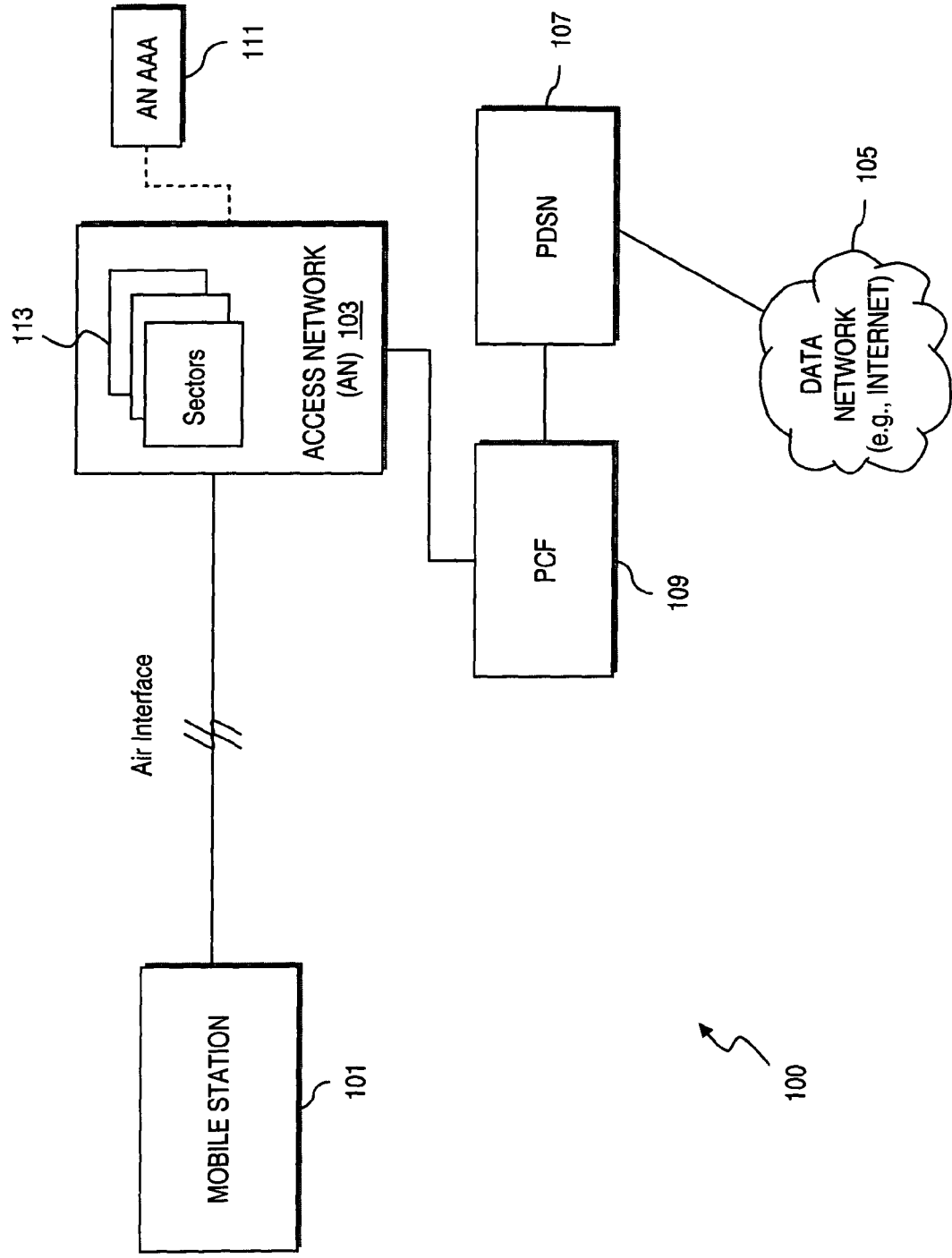
FIG. 1 is a diagram of a wireless system architecture for supporting various applications in which location information of a mobile station is utilized, in accordance with an embodiment of the invention.

FIG. 1 is a diagram of a wireless system architecture for supporting various applications in which location information of a mobile station is utilized, in accordance with an embodiment of the invention. According to one embodiment of the invention, a radio network 100 includes one or more mobile stations 101 in which one mobile station (MS) 101 is shown in communication with an access network (AN) 103 over an air interface. As used herein, the term "mobile station" or "mobile node" can include an access terminal (AT) or any mobile unit or device, while the access network 103 can be a base station. In this example, the mobile station 101 is a device that provides data connectivity to a user. For example, the mobile station 101 can be connected to a computing system, such as a personal computer, a personal digital assistant, etc. or a data service enabled cellular handset. The AN 103 can be a network equipment that provides data connectivity between a packet switched data network 105, such as the global Internet and the mobile station 101.

For the purposes of illustration, the system 100 may be a cdma2000 system; such systems are detailed in TSG-C.S0024-IS-856, entitled "cdma2000 High Rate Packet Data Air Interface Specification," which is incorporated herein by reference in its entirety.

Determination of the location of the mobile node 101 plays an important role in services supported by the system 100, which can be a radio telecommunication network that supports an Internet Protocol (IP)-based LoCation Services (IP-LCS). Tracking (one time or periodic) of users who roam within cellular systems, for instance, poses an engineering challenge particularly if multiple operator domains are involved. Periodic tracking of mobile nodes or users are described in the Third Generation Partnership Project 2 (3GPP2) IP-LCS specification TSG-X (CSN) X.P0024-04 v0.13 and the Secure User Plane Location (SUPL) specification (OMA-RD-SIPL-V1_0-20040930-C) of Open Mobile Alliance (OMA), both of which are incorporated herein by reference in their entireties. When a network initiates a periodic session based Location Based Agent (LBA) or a mobile node based LBA, the location of a mobile node or user is tracked periodically and is fed to the LBA, which then offers appropriate service based on the current location of the mobile node or user.

The AN 103 communicates with a Packet Data Service Node (PDSN) 107 via a Packet Control Function (PCF) 109. Either the AN 103 or the PCF 109 provides a SC/MM (Session Control and Mobility Management) function, which among other functions includes storing of high rate packet data (HRPD) session related information, performing the terminal authentication procedure to determine whether a MS 101 should be authenticated when the MS 101 is accessing the network 103, and managing the location of the MS 101. The PCF 109 is further described in 3GPP2 A.S0001-A v2.0, entitled "3GPP2 Access Network Interfaces Interoperability Specification," June 2001, which is incorporated herein by reference in its entirety.

In addition, the AN 103 communicates with an AN AAA (Authentication, Authorization and Accounting) entity 111, which provides terminal authentication and authorization functions for the AN.

By way of example, the AN 103 includes a high data rate (HDR) base station to support high data rate services. It should be understood that the base station provides the RF interface (carrier(s)) between the mobile station 101 and the network 103 via one or more transceivers. The base station can provide a separate data only (DO) carrier for high data rate applications for each sector (or cell) 113 served by the HDR base station. A separate base station or carrier (not shown) provides the voice carrier(s) for voice applications. The MS 101 may be a DO access terminal or a dual mode mobile station capable of utilizing both voice services and data services. To engage in a data session, the mobile station 101 connects to a DO carrier to use the DO high-speed data service. The data session is controlled by the Packet Data Service Node (PDSN) 107, which routes all data packets between the MS 101 and the Internet 105.

As seen in FIG. 1, the PDSN 107 has a direct connection to a Packet Control Function (PCF) 109, which interfaces with a Base Station Controller (BSC) (not shown) of the HDR base station. The BSC is responsible for operation, maintenance and administration of the HDR base station, speech coding, rate adaptation and handling of the radio resources. It should be understood that the BSC may be a separate node or may be co-located with one or more HDR base stations.

Each HDR base station can serve multiple (e.g., three) sectors (or cells) 113. However, it should be understood that each HDR base station may serve only a single cell (referred to as an omni cell). It should also be understood that the network 103 may include multiple HDR base stations, each serving one or more sectors, with HDR mobile stations 101 being capable of handing off between sectors of the same HDR base station or sectors 113 of different HDR base stations. For each sector (or cell) 113, the HDR base station further employs a single shared, time division multiplexed (TDM) forward link, where only a single HDR mobile station 101 is served at any instance. The forward link throughput rate is shared by all HDR mobile stations 101. A HDR access terminal 101 selects a serving sector (or cell) 113 of the HDR base station by pointing its Data Rate Control (DRC) towards the sector 113 and requesting a forward data rate according to the channel conditions (i.e., based on the Carrier to Interference (C/I) ratio of the channel).

Figure 2:
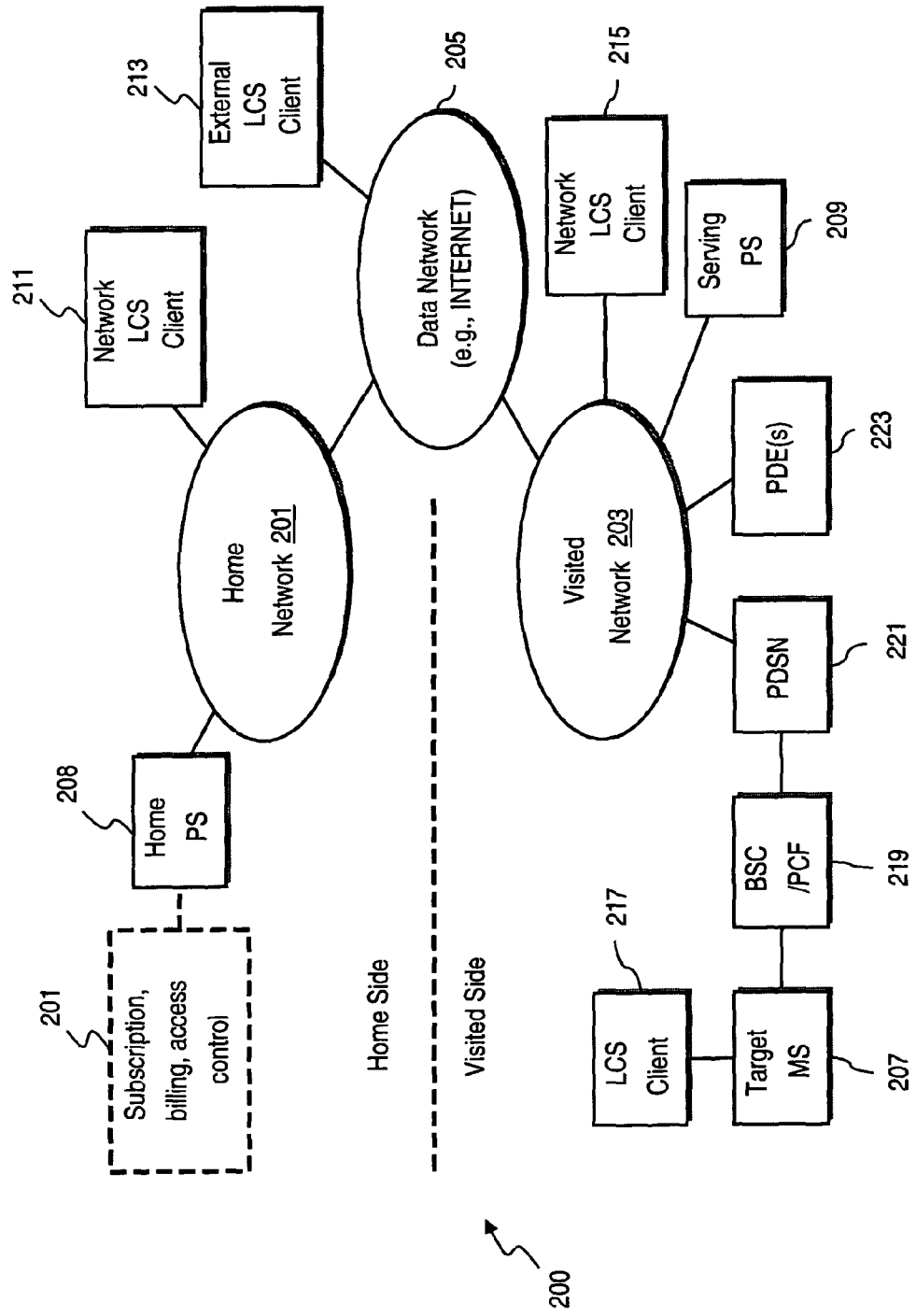
FIG. 2 is a diagram of an Internet Protocol (IP)-based LoCation Services (LCS) reference model, in accordance with an embodiment of the invention.

FIG. 2 is a diagram of an Internet Protocol (IP)-based LoCation Services (LCS) reference model, in accordance with an embodiment of the invention. The communication system 200 includes a home network 201 and a visited network 203, which are interconnected over a data network 205 (which can be the global Internet, for example). The home network part of the communication system also includes an IP network of the carrier that operates the home network. The IP network is here designated as Wireless Network Operator (WNO) IP network. A network-positioned entity, here referred to as a home positioning server (home PS) is coupled to the network; subscription, billing, and access control functionality is coupled to the entity.

The location service is a framework offered in a wireless (e.g., Code Division Multiple Access (CDMA)) network to initiate, calculate, and deliver geographical location information of a target mobile station (or node) 207. The network elements supporting this location service within the communication system 200 can be considered a "mobile positioning center." This mobile positioning center accepts requests for position determination of the target mobile station 207 from location service clients, forms authentication, authorization, and accounting (AAA) functions as well as controls the discovery and assignment of resources.

Location tracking of a mobile node, according to various embodiments of the invention, can involve the following scenarios: periodic tracking, one-time or single tracking, and "deferred" (or conditional) tracking. With a deferred tracking request, the mobile node's location information is obtained when a particular condition (e.g., time based or event based) occurs. For instance, the location information can be provided at some point in the future, or when the mobile node moves into a particular location, etc. Thus, while the mobile node is waiting for this condition to occur, if the mobile node's domain changes handoff signaling occurs.

During the roaming process, a mobile node or user can roam out of one administrative domain into another—i.e., the mobile station 207 leaves the home network 201 and enters the visited network 203. If this situation occurs during a tracking session, the service offered by the application will be affected, particularly if an assigned entity for determining position (e.g., position determining entity (PDE)) in the visited/home network (e.g., networks 203 and 201) that currently assists mobile nodes or users to determine their location has a private non-globally routable network address (e.g., IP address). In such a case, further communication between the mobile node 207 and the PDE in the previous network will not be possible as the IP packets will not reach the PDE. Further since private addresses have a local scope, they do not need to be globally unique. Therefore, any messages sent by the mobile node to the prior or old PDE may actually reach a valid node in the new network, which would then simply drop the packet (e.g., in the case where it is not part of the IP-LCS architecture). If there is a node in the new network that is part of the LCS architecture with the same private address (such as a PDE, PDE2) then the node may perceive this as unwanted traffic or, for example, as a denial of service (DoS) attack. Also since these messages are protected using a security association, PDE2 will not be able to identify the contents of the message. It might therefore send an error message back to the mobile node that is indicative of a loss of security keys or just that it is not able to authenticate the message. The conventional IP-LCS architecture fails to consider this scenario, and therefore provides no approaches to the problem.

In the system 200, a home network 201 is a wireless packet data network that serves a target mobile station 207; that is, the mobile station 207 is a subscriber to the network 201.

The visited network 203 designates any wireless packet data network that can support communication services for the target mobile station 207 other than the home network 203. Under this scenario, the serving network can be either the home network 201 when the target mobile station 207 is "at home" or the visited network 203 when the target mobile station 207 is roaming.

A position server is a network entity that coordinates the IP-LCS signaling for determining the location information of a target mobile station to requesting entities. In an exemplary embodiment, a home PS 208 and a serving PS 209 can be implemented as two distinct functions, but may be physically co-located. The position server performs functions, such as accepting and responding to the requests for location estimate of the target mobile station 207, authentication, service authorization, privacy control, billing, allocation of resources for determining positions, such as position determining entities (PDEs), etc.

The target mobile station 207 is the mobile station whose position information is requested by a LCS client (e.g., clients 211, 213, 215 or 217). In other words, the LCS client forms an application, or other entity, that initiates location services and receives geographical location information associated with the target mobile station. Location service clients are capable of initiating a location service and of receiving geographical location information of a target mobile station, such as the mobile station.

Accordingly, the LCS client is a software and/or hardware entity that interacts with an LCS server for the purpose of obtaining location information about a specific mobile station. The LCS client is responsible for formatting and presenting data and managing the dialogue. The LCS client may reside in the mobile station. The LCS client, according to various embodiments, can reside in any number of components—e.g., a network LCS client 211 of the home network 201, an external LCS client 213 that is external to both wireless networks 201 and 203, a network LCS client 215 of the visited network 203. The LCS client 217 can also reside within the target mobile station 207. Thus, the LCS client serves as an interface to a LCS server functionality in the wireless packet data network (e.g., network 201 or 203).

The visited network 203 includes a base station controller/packet control function (BSC/PCF) 219 to which the mobile station 207 is connected. The BCS is the entity that provides control and management for one or more Base Transceiver Stations (BTS) (not shown). This connection is representative both of radio channels defined upon a radio air interface and network connections that extend to the BSC/PCF 219. The PCF can interface to an access gateway to support bearer streams between the mobile station 207 and an Internet Protocol (IP) multimedia core network. The base station controller/packet control function 219 is, in turn, coupled to a packet data support node (PDSN) 221.

The visited network 203, as shown, includes one or more entities for determining position, such as position determining entities (PDEs) 223. During a periodic session, a particular position determining entity may be assigned to help determine the location of the target mobile node 207. Therefore, when the mobile node 207 moves into an administrative domain that is different from that of currently existing PDE, the periodic session will fail, as the new position determining entity may not offer such service. This can be attributed to either the mobile node 207 having moved out of its service domain, or if the original position determining entity has a non-globally routable network address (e.g., IP address), and thus, this position determining entity is unable to reach the mobile node 207. This recognized problem has not been properly addressed in convention approaches.

The process of FIG. 3, below, provides an effective approach for the handoff between position determining entities in support of location tracking (for any of the tracking scenarios: one-time, deferred, or periodic).

Figure 3:
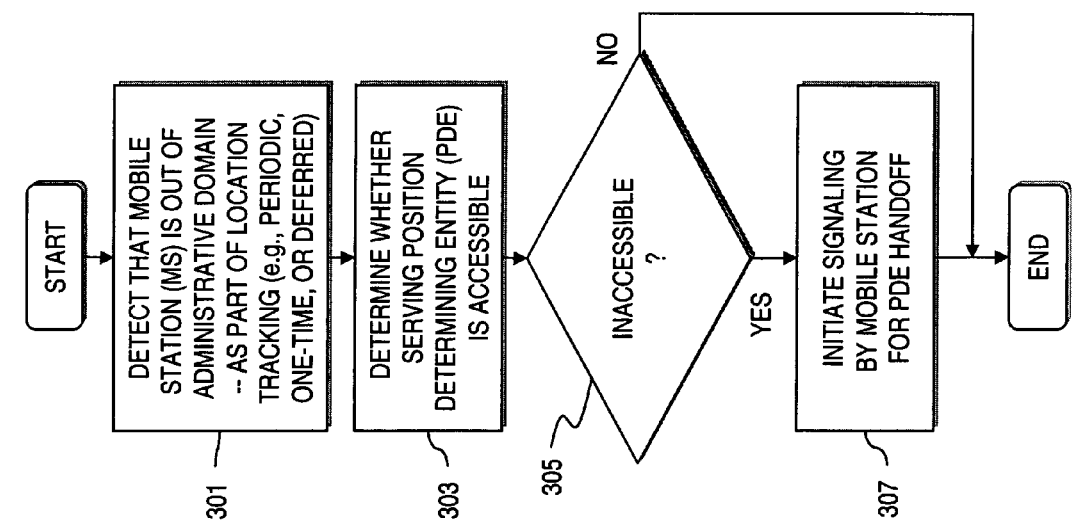
FIG. 3 is a flowchart of a handoff process associated with a mobile station outside an administrative domain, in accordance with an embodiment of the invention.

FIG. 3 is a flowchart of a handoff process associated with a mobile station outside an administrative domain, in accordance with an embodiment of the invention. In step 301, it is detected or otherwise determined that the mobile station 207 has moved outside of its administrative domain—e.g., from the home network 201 to the visited network 203. Some exemplary approaches that the mobile node may employ to make this determination include the following: (i) listening to broadcast information on the signaling channel at the new network; (ii) detecting that the mobile node's IP address has changed, etc. Such detection can be based on other information, such as router advertisements or cell ID information. A determination is then made, per step 303, whether the serving position determining entity is accessible. If the serving position determining entity is inaccessible, the mobile station 207 initiates the signaling for PDE handoff (steps 305 and 307).

Figure 4:
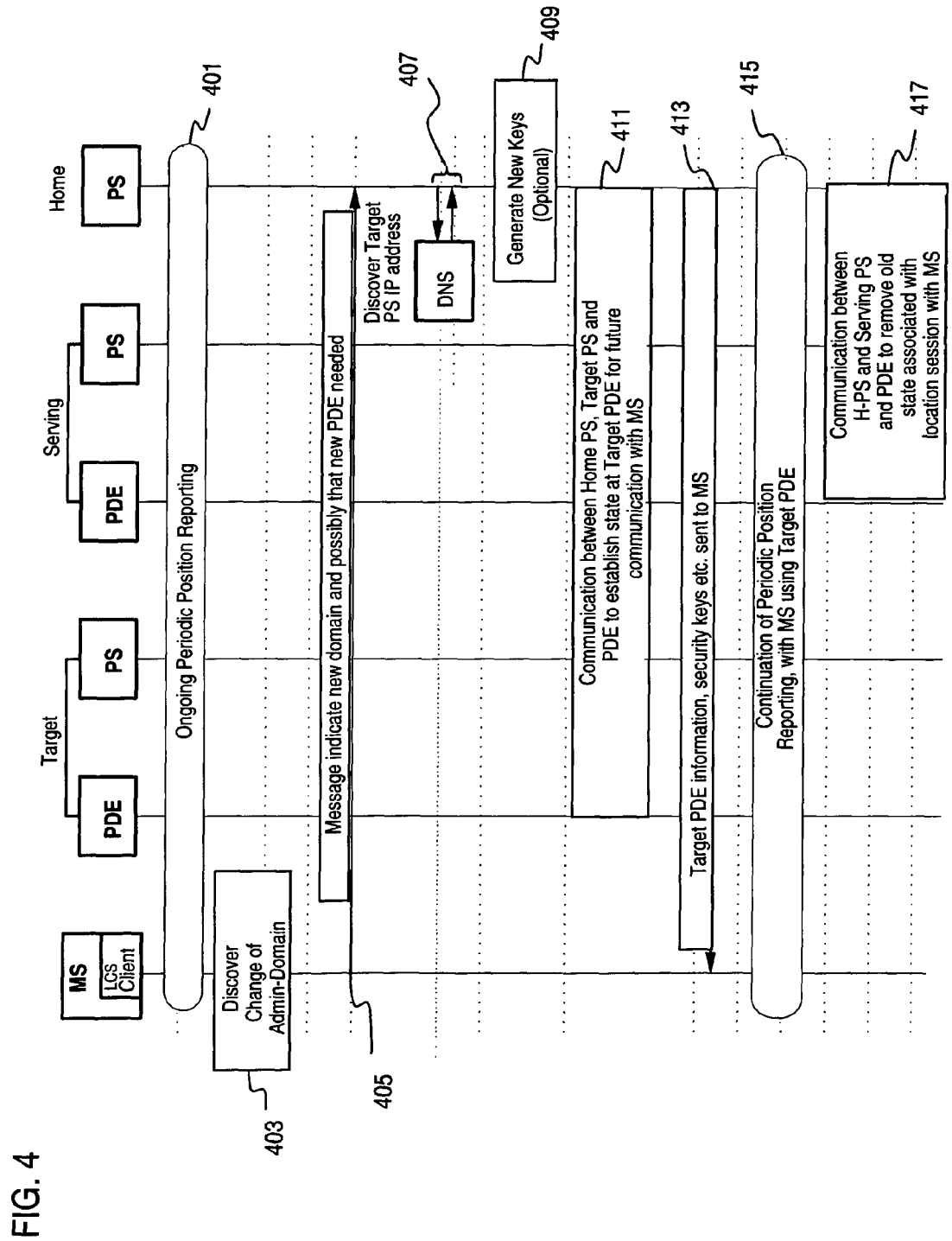
FIG. 4 is a flow diagram of a protocol providing signaling when a position determining entity (PDE) has a private network address (non-proxy case), in accordance with an embodiment of the invention.
Figure 5:
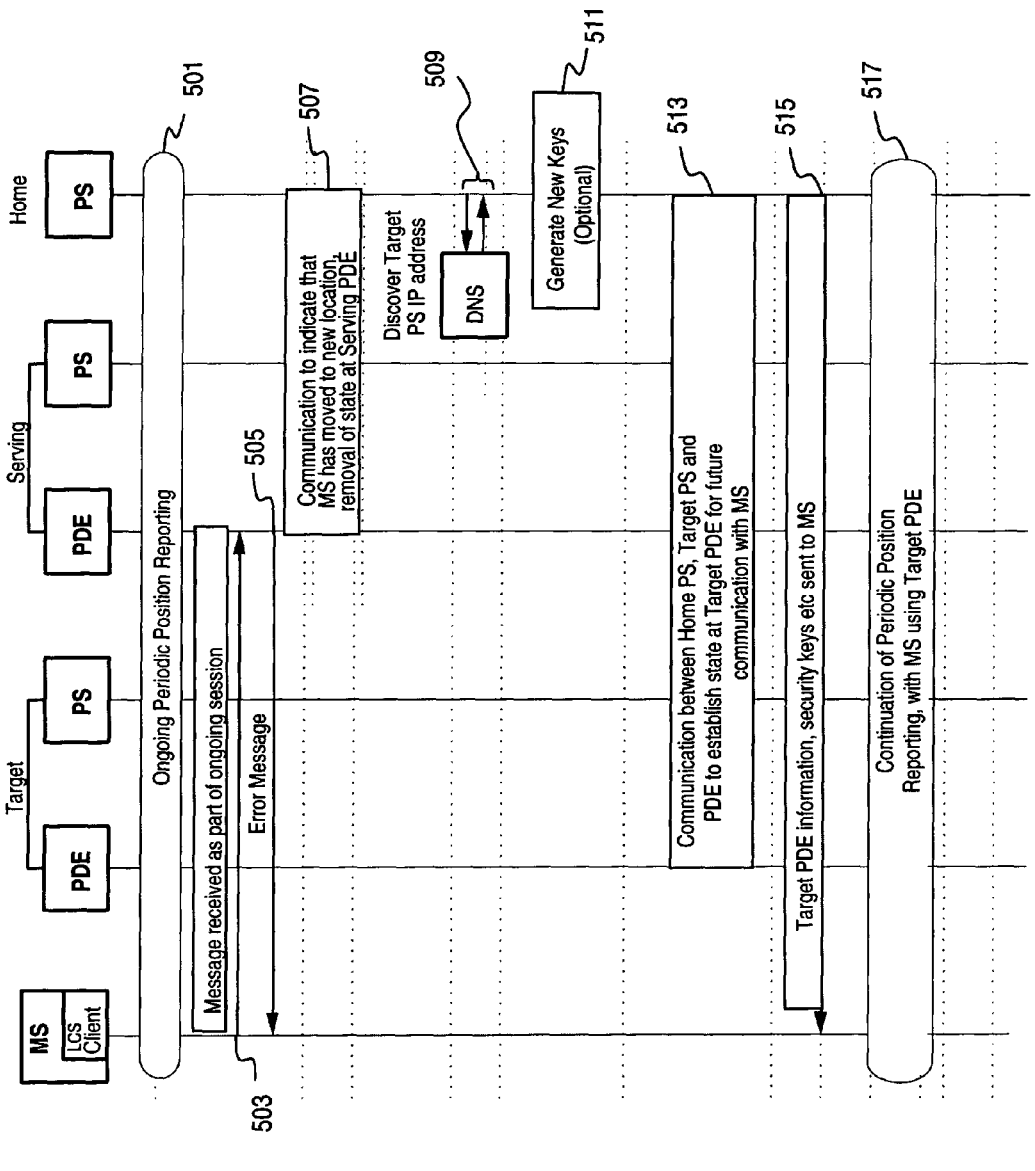
FIG. 5 is a flow diagram of a protocol providing signaling when a position determining entity has a public (or global) network address (non-proxy case), in accordance with an embodiment of the invention.

The handoff process is more fully described with respect to FIGS. 4-6. For illustrative purposes, the handoff process is explained with respect to periodic tracking. However, it is recognized that such handoff procedure has applicability to the single tracking and deferred tracking scenarios.

According to one embodiment of the invention, to address the problem with PDE handoff, two modes of operation, in an exemplary embodiment, are considered: (1) a non-proxy mode, in which the mobile node 207 establishes direct communication with the serving network nodes; and (2) a proxy-mode, in which the mobile node 207 establishes indirect communication with the serving network—i.e., the mobile node communicates with the serving network via the home PS. It is noted that the network that the mobile node is currently roaming in can be the home network 201 or a visited network 203.

FIG. 4 is a flow diagram of a protocol providing signaling when the position determining entity (PDE) has a private network address (non-proxy case), in accordance with an embodiment of the invention. For the purposes of illustration, PDEs are described as PDE1 and PDE2 (although not labeled as such in the figure), and can assume the role of target PDE or Serving PDE depending on the location of the mobile node 207; likewise, the associated position servers can be referred to as PS1 and PS2. In this case, a mobile station 207 that is roaming in, for instance, the home network 201, and is in communication with PDE1 and PS1. The PDE1 has a private address (non-globally routable address or site-local IP address). The mobile station 207 then moves into a different network, such as the visited network 203. When PDE1 is initially assigned to the mobile station 207 for the periodic session, the mobile station 207 is able to ascertain that PDE1 has a private address.

In step 401, a periodic position reporting session is ongoing. As previously explained, when the mobile station 207 moves into a new administrative domain, such as a new operator's network (e.g., visited network 203), the mobile station 207 determines that it is a new administrative domain. The invention, according to an exemplary embodiment, provides a mechanism for monitoring an ongoing periodic location request and raising a trigger to modify the ongoing location signaling to address the administrative domain change. Once this trigger is raised, the mobile station 207 can utilize a cancel message (e.g., SUPL_CANCEL message) to cancel periodic position reporting initiated by the mobile station 207.

The mobile station 207 discovers a change of administrative domain, per step 403, and sends a message to the home PS to indicate the new domain, and optionally, that a new PDE is needed (step 405). Irrespective of how the mobile station 207 determines the change of location, the mobile station 207 is aware that a periodic session is ongoing and that any messaging that has to transpire with the current serving PDE (i.e., PDE1) will not be successful. A trigger is therefore sent to the LCS client in the mobile station 207 to take appropriate steps to re-establish appropriate state in the new network as to enable the mobile station 207 to resume the periodic session at the new network. In an exemplary embodiment, the mobile station 207 also indicates the number of tracking periods remaining in the session. The mobile station 207 therefore initiates a message to the home PS 208. This message contains information for the home PS to identify the tracking session involving the mobile station 207.

In response, the home PS 208 attempts to discover the network address (e.g., IP address) of the target PS through a DNS look-up procedure, as in step 407. Based on a Fully Qualified Domain Name (FQDN) of the mobile node 207, the home PS identifies a new serving PS (PS2) for the mobile node in the new network. In co-ordination with PS2, a new PDE (PDE2) is assigned for the mobile node 207. Alternatively, the home PS 208 can use the current IP address of the mobile node to discover the new serving PS.

Thereafter, the optional process of generating new keys can occur (step 409). A new set of security keys may be established to secure further communication between the mobile node 207 and PDE2. However, this would imply that a new TLS-PSK (Transport Layer Security-Pre Shared Key) handshake has to happen between the mobile node 207 and PDE2 before further communication. Transport Layer Security (TLS) is an authentication protocol that establishes a secure channel, as well as mutual authentication, protected cipher suite negotiation and key exchange between two entities. TLS handshake uses certificates and Public Key Infrastructure (PKI) for mutual authentication and key exchange. In the case that the key that was used to derive session keys for securing the mobile node 207—PDE1 communication is pushed to PDE2, then some TLS-PSK handshake messages may be saved. In both cases, the mobile node is informed about the keys that it has to use to secure its communication with PDE2.

Per step 411, the home PS 208, target PS and serving PDE communicate to establish future communication between a target PDE and the mobile node 207. Next, the home PS 208 forwards information about the target PDE, security keys, etc. to the mobile node 207 (step 413). Consequently, the periodic position reporting session can continue with the target PDE, as in step 415. In step 417, the home PS 208, the serving PS, and the serving PDE coordinate to remove state information associated with the former location session with the mobile node 207. Once the state is setup at PDE2, and the mobile node has received all the information to continue the tracking session, the mobile node contacts PDE2 and restarts the session. The home PS 208, in parallel, also sends a message to PDE1 so that it can free up the state reserved for the periodic session with the mobile node 207.

Therefore, the mobile station 207 reestablishes the entire periodic location process at the new target PDE. It is noted, however, that this can lead to two more messages over the air, as the mobile node 207 first sends a SUPL_CANCEL and receives an acknowledgement for the message. The mobile station 207 restarts the periodic messaging using a start message—e.g., a SUPL_START message (as described in the Appendix). In an embodiment of the invention, a SUPL_CANCEL is not sent, as the mobile station 207 may not want to cancel the process, but simply re-establish at a new position.

Also, the mobile station 207 can initiate messaging to the position server stemming from the non-reachability of the position determining entity (as more fully described in the Appendix). In an exemplary embodiment, timers are set to determine non-reachability; that is, upon expiration of the timers, non-reachability is declared. However in another scenario, the mobile station 207 may not want wait because the mobile station 207 knows that if the PDE1 has a private address, waiting for the timers to expire is not necessary.

In the above discussion, the mobile station 207 sends a SUPL_CANCEL immediately after receiving the trigger that the administrative domain has changed for re-establishing the session at the new network. Alternatively, a failure message (e.g., SUPL_FAILURE message) is utilized instead of the SUPL_CANCEL. This failure message from the mobile station 207 to the home PS 208 can be a modification of the SUPL_FAILURE message of the existing standard. The existing SUPL_FAILURE message is sent only if there is an error in either a SUPL_INIT or SUPL_FAILURE.

In an alternative embodiment, the LCS client 217 on the mobile station 207 on receiving a trigger about the change of administrative domain, the mobile station 207 sends a cancel message, e.g., the SUPL_CANCEL message, to the home PS 208 to cancel the existing periodic tracking session. The home PS 208 on receipt of this message will release state at the PDE at the previous network. The mobile station 207 then sends a start message, such as SUPL_START, to the home PS 208 to start another periodic session at the new domain. The start message specifies sufficient information to uniquely indicate the mobile station 207. The methodology to cancel and start a periodic session can be found, for example, in Third Generation Partnership Project 2 (3GPP2) IP-LCS specification TSG-X (CSN) X.P0024-04 v0.13.

FIG. 5 is a flow diagram of a protocol providing signaling when a position determining entity has a public (or global) network address (non-proxy case), in accordance with an embodiment of the invention. It noted that once the mobile node 207 realizes that it has moved into a different domain, the mobile node 207 may not wish to contact the previous PDE (this could be based, for example, on some network policy). Under this scenario, the mobile station 207 is communicating with the home PS 208 in a periodic position reporting session, per step 501. The mobile station 207, as in steps 503 and 505, attempts to continue the position reporting to the serving PDE, which does not accept the communication and acknowledges with an error message.

If the mobile node 207 decides to contact PDE1, the mobile node 207 re-establishes, for instance, a Transmission Control Protocol (TCP), assuming TCP session continuity is implemented (e.g., WTLS). WTLS is based on Secure Sockets Layer/Transport Layer Security (SSL/TLS), and is used by Wireless Application Protocol (WAP) devices, such as mobile phone handsets and personal digital assistants (PDAs). The mobile node 207 then resumes a TLS-PSK (Pre-Shared Key) session with the PDE1, as the mobile node's IP address would have changed in the new network.

If PDE1 does not accept this message for any reason (e.g., the message is from a different IP address), the PDE1 sends an appropriate error message to the mobile node 207, and the mobile node 207 initiates a communication with the home PS 208 to re-establish state at PDE2 as described in the various embodiments in case1. Even if PDE 1 does accept the message from the mobile node 207 from a potentially different IP address, the PDE1 may still refuse to provide service for the mobile node 207. This refusal can stem from a variety of reasons. For example, the mobile node's current location may be beyond the area served by PDE1, or PDE1 may not wish to offer service to a mobile node 207 that is currently roaming in a different administrative domain.

Irrespective of the reason, if PDE1 decides not to offer service to the mobile node 207, appropriate action is taken so that the mobile node 207 receives the periodic location service at its new point of connectivity. In step 507, the serving PS 209 and the home PS 208 communicate to learn that the mobile station 207 has moved to a new location, and to coordinate removal of state information at the serving PDE. Steps 509-517 are similar to the steps of the process of FIG. 4.

In one embodiment, the PDE1 can send an error message to the mobile node 207. On the receipt of this error message, the mobile node 207 can contact the home PS 208 by sending a suitable message. The home PS 208 on the receipt of this message acts in a similar fashion as described in one of the embodiments described in FIG. 4, to re-establish state at the new administrative domain so that appropriate service can be offered to the mobile node 207.

Alternatively, the PDE may initiate messaging with the home PS 208 via the serving PS 209, to indicate that PDE1 is unable to offer further service to the mobile node 207. This message can also include the required information for the home PS 208 to identify the session. Further, the message may contain the FQDN and IP address of the mobile node 207 in the new domain. Upon receipt of such a message, the home PS 208 can initiate secure messaging to establish a new target PS and PDE. A new state is established, in a secure manner, at the target PS and PDE (e.g., PDE2) to serve the mobile node 207 in the new domain.

Additionally, the home PS 208 informs the mobile node 207 about the change in PDE via a message that contains sufficient information for the mobile node 207 to establish secure communication with the target PDE in the future. The message can be transported, for example, as a Short Message Service (SMS), Wireless Application Protocol (WAP) Push or a dedicated IP message. According to one embodiment of the invention, the PDE1 can also send an appropriate error message to the mobile node 207 to inform the mobile node 207 that such an action has been taken by PDE1. Once the mobile node 207 receives the new information, the mobile node 207 can then resume the periodic tracking session at PDE2.

As described earlier, during a proxy based periodic tracking session, all traffic between the mobile node 207 and PDE1 are exchanged via the home PS 208. When the mobile node 207 initiates communication from the new domain during a periodic tracking session, the home PS 208 will first receive this message (assuming TCP session resume and TLS-PSK resumption between the mobile node at the new IP address and the Home-PS). The home PS 208, on receipt of this message, knows that the mobile node 207 has moved into a new administrative domain based on the information contained in the message such as the mobile station's IP address. If the home PS 208 can determine the current PDE (i.e., PDE1) and can still serve the mobile node, the home PS 208 can forward the message to PDE1.

The process of determining whether PDE1 can serve the mobile node at its new location may include contacting the current serving PS and PDE1. However, if PDE1 is the Home-PDE (in this case the serving PS and the home PS 208 are the same) then the home PS 208 may, on its own, be able to decide whether the Home PDE can serve the mobile node at its new location. If the home PS 208 is unable to establish this on its own, it may send messages to various network components, including the Home PDE to ascertain this fact. If the home PS 208 determines that the PDE needs to be changed, the home PS 208 has the appropriate messaging to re-establish state at PDE2.

The home PS 208 first determines a target PS and PDE (PDE2); this can be accomplished using several techniques including contacting the local DNS server. The home PS 208 then contacts the target PS and PDE, in a secure fashion, to ensure that the target PDE can serve the mobile node's location requests. If the target PDE is capable, then the state is established in the target PDE and PS. Once such a state is established at the new PDE and PS, the home PS 208 may also inform the mobile station about the change in the PDE. However, in an exemplary embodiment, this notification is optional.

If the mobile station uses end-to-end security in its communication with the PDE then home PS 208 also establishes keys to enable secure communication, with the mobile station, at the new PDE. On receipt of this message the mobile node contacts the new PDE, via the home PS 208, at the next time its location needs to be determined. The PDE2 then helps determine the mobile node's location.

In the event that the home PS 208 does not allow the mobile node to continue the current periodic session as described previously, the home PS 208 informs the mobile node, as well as the location based agent (e.g., either network based or mobile based) that needs the location information of the mobile node, of the decision via a suitable error (or cancel) message. The mobile node re-establishes a periodic tracking session for the mobile node at the new administrative domain.

In an alternative embodiment, the mobile station upon detecting that the administrative domain has changed may initiate specific messaging with the home PS 208 to make sure that the current PDE can still satisfy the requirements of the periodic tracking session at the mobile station's new location. On receipt of such signaling, the home PS 208 can then establish state at a new PDE as described previously in FIG. 5.

In an alternative embodiment, the LCS client on the mobile station on receiving a trigger about the change of administrative domain, the mobile station sends a message, such as a SUPL_CANCEL message, to the home PS 208 to cancel the existing periodic tracking session. The Home-PS on receipt of this message will release state at the PDE at the previous network. The mobile station then sends another message (e.g., SUPL_START) to the home PS 208 to start another periodic session at the new domain. The start message has to contain enough information to indicate the mobile station. The methodology to cancel and to start a periodic session can be found in the current 3GPP2 specification.

Figure 6A:
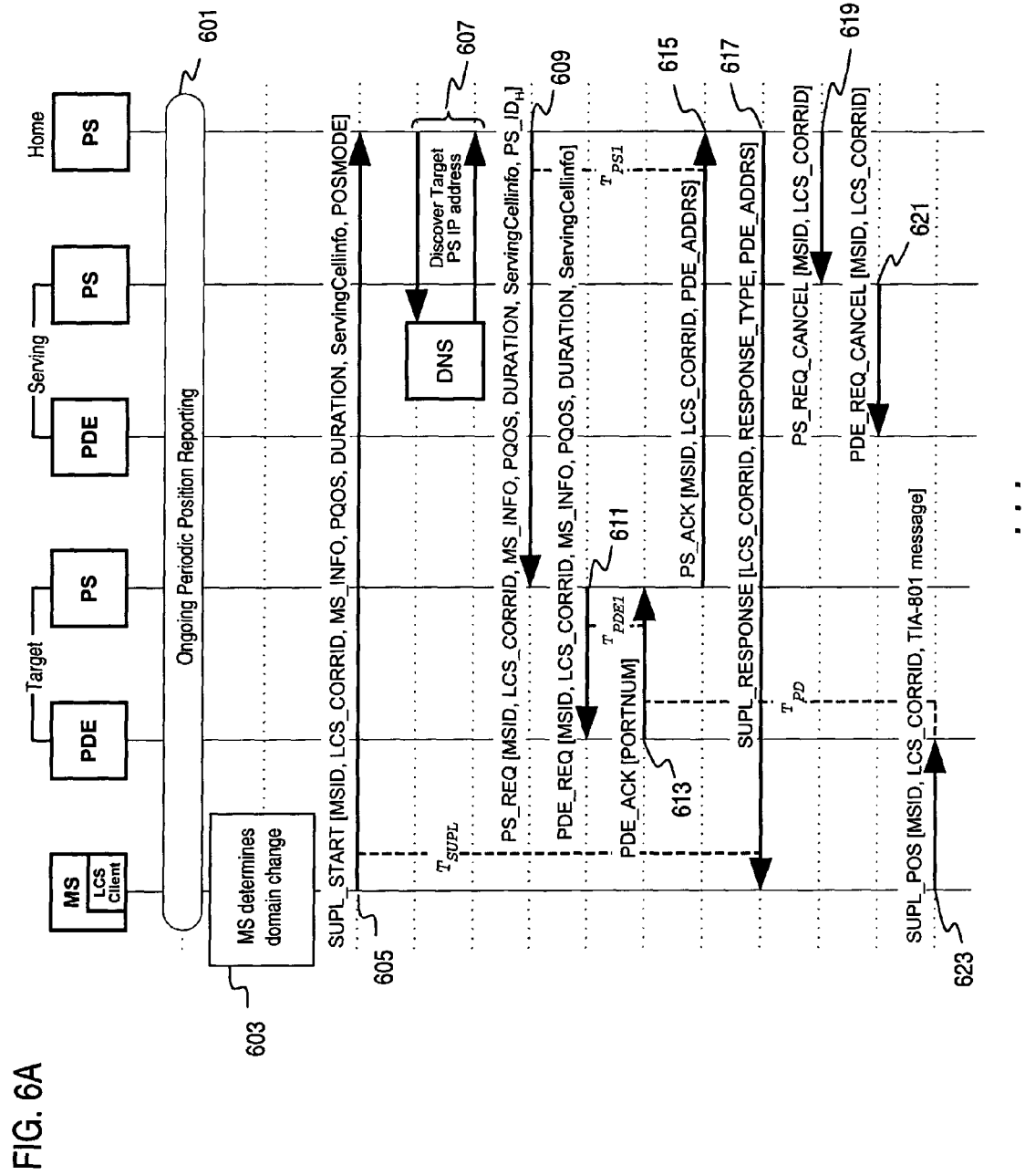
FIGS. 6A and 6B are flow diagrams involving a target mobile station detecting change in administrative domain, in accordance with an embodiment of the invention.
Figure 6B:
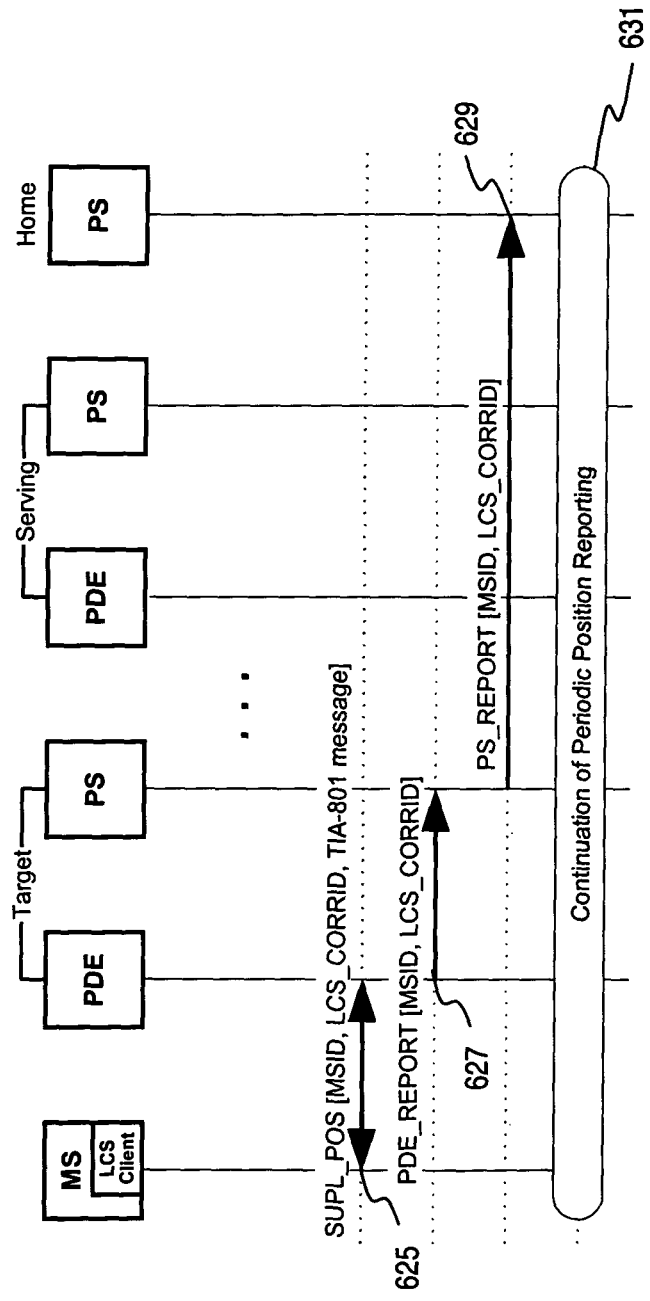

FIGS. 6A and 6B are flow diagrams involving a target mobile station detecting change in administrative domain, in accordance with an embodiment of the invention. The signaling described in this example is also applicable for a mobile node roaming out of a Home PDE's domain, while engaged in a periodic position reporting session. By way of example, the signaling complies with the TIA-801 specification (e.g., C.S0022-A v1.0, Position Determination Service for cdma2000 Spread Spectrum Systems, April 2004); which is incorporated herein by reference in its entirety. Table 1, below, lists the messages and parameters utilized in the process of FIGS. 6A and 6B:

TABLE 1

| MESSAGE/ PARAMETER | DESCRIPTION |
| --- | --- |
| DURATION | Parameter specifying length of time of periodic reporting session |
| LCS_CORRID | LCS correlation ID parameter assigned to position request |
| MSID | MobileIdentificationNumber or IMSI (International Mobile Station Identity) subscription identifier; e.g., mobile stations that support X.S0024 (IP-Based Location Services) are equipped with a MSID |
| MS_INFO | MS_Information (MS_INFO) parameter identifies the position determination technologies and positioning protocols that are supported by the Target MS |
| NID | Network Identification Code parameter |
| PDE_ACK | PDE acknowledgement message; for example, when a Serving PDE initiates Periodic Position Reporting (i.e., sends a PDE_ACK to the serving PS), the PDE starts an internal timer set to the time duration of the periodic position reporting session |
| PDE_ADDRS | PDE address parameter identifies, e.g., the IP address of the PDE to be used for the positioning session |

TABLE 1-continued

| MESSAGE/ PARAMETER | DESCRIPTION |
|---|---|
| PDE_REPORT | PDE report message; e.g., the PDE sends a PDE_REPORT to the visited PS to indicate the type of [TIA-801] service provided to the MS (i.e., MS-based session completed) for data recording purposes |
| PDE_REQ | PDE request message requesting allocation of PDE resources for position determination |
| PDE_REQ_CANCEL | PDE request cancel message to release allocated PDE resources for indicated periodic position reporting session |
| PORTNUM | Port number parameter |
| POSMODE | Position mode parameter that is set to indicate the positioning mode to be used for the Periodic Position Reporting session |
| POSREQTYPE | Position request type parameter is set to indicate that serving cell position information is requested |
| PQOS | Position Quality of Service parameter is set to indicate the requested Quality of Position |
| PS_ID | Position Server Identity parameter is set to indicate the home PS identity |
| PS_REPORT | Position Server report message; e.g., the Visited PS sends a PS_REPORT to the home PS to indicate the type of [TIA-801] service provided to the MS, for data recording purposes |
| PS_REQ | Position Server request message; for example, when a PS initiates Periodic Position Reporting (i.e., serving PS sends a PDE_REQ to Serving PDE, home PS sends a PS_REQ to Visited PS) |
| PS_REQ_CANCEL | Position Server request cancel message for canceling the periodic position reporting for the indicated MS |
| RESPONSE_TYPE | Response type parameter can be set to indicate Non-Proxy Mode (i.e., the MS should send all [TIA-801] messages directly to the PDE) |
| ServingCellinfo | Serving cell information parameter specifies current serving system information; e.g., for serving CDMA systems, the ServingCellInfo is comprised of the SID, NID, BASE_ID and other parameters |
| SID | System identification parameter |
| SUPL_POS | Secure User Plane Position parameter; e.g., the SUPL_POS includes the initial [TIA-801] message |
| SUPL_RESPONSE | Secure User Plane response message; SUPL_RESPONSE includes the POSINFO parameter set to indicate the Target MS's position information |
| SUPL_START | Secure User Plane start message; e.g., message enables the PS and PDE to associate all [TIA-801] messaging with this Periodic Position Request |

When the Target MS 207 determines that it has moved into a new administrative domain and the Serving PDE is inaccessible, the Target MS 207 re-initiates a SUPL_START to the home PS 208. The Target MS 207 adjusts the Duration parameter to account for the positioning already performed and sets the POSMODE parameter value to Serving PDE handoff. The Target MS 207 reuses the same POSMODE value, as described in the Appendix. However, the Target MS 207 makes the determination to send the SUPL_START due to a change in administrative domain. A different POSMODE value, for example, could be used to uniquely identify this case. The home PS 208 contacts a new target PS to allocate a new PDE and directs the original serving PS (and Serving PDE) to free all resources allocated for the periodic position reporting session.

As seen in FIG. 6A, a periodic position reporting session is ongoing (step 601). The MS determines, as in step 603, that there has been an administrative domain change and that the Serving PDE is inaccessible, e.g., due to Serving PDE having a private IP address. The Target MS 207 establishes a secure IP connection to the home PS 208 and sends a new SUPL_START to the home PS 208, per step 605. The LCS_COR-RID parameter is set to the value originally assigned for the periodic position reporting session. The DURATION parameter is set to reflect the remaining duration of the periodic positioning session. The POSMODE parameter is set to indicate Serving PDE handoff to indicate to the home PS 208 that this is a handoff request. It is noted that a new POSMODE value to uniquely identify this case could also be used.

If the home PS 208 does not have the IP address of the target PS, the home PS 208 formulates a fully qualified domain name using the received SID and NID parameter values (e.g., NID.SID.cdma.lcs_manager.lcs.net). The home PS 208 determines that the Target MS 207 has roamed into a new administrative domain. Using the fully qualified domain name, the home PS 208 queries the domain name server (DNS), per step 607. It is noted that alternatively, the home PS 208 could also determine a domain change using IP layer information received as part of the SUPL_START message from the Target MS 207. If the DNS lookup is performed, the DNS responds to the home PS 208.

The home PS 208 establishes a secure IP connection to the target PS and sends a PS_REQ to the target PS (step 609). The home PS 208 includes the parameters received from the MS at step 607, and includes the PS_ID parameter set to identify the home PS 208. The POSREQTYPE parameter is set to indicate A-GPS (i.e., the positioning mode to be used). The target PS does not need any information related to handoff from the old Serving PDE.

The target PS verifies that the position information request was received from an authorized entity (i.e., the home PS 208). The target PS selects a PDE and sends a PDE_REQ to the target PDE requesting allocation of PDE resources for position determination (step 611). The target PS relays parameters received from the home PS 208.

In step 613, the target PDE allocates resources for position determination and sends a PDE_ACK to the target PS. The response, for example, includes the Port Number and other information elements needed for secure communication between the target PDE and Target MS 207. According to one embodiment of the invention, the PDE may include other parameters needed for position determination.

The target PS returns the target PDE information to the home PS 208 (step 615). In step 617, the home PS 208 returns the target PDE address information to the MS. The RESPONSE_TYPE parameter is set to indicate Proceed with [TIA-801]—Non-proxy Mode. The MS releases the IP connection to the home PS 208.

The home PS 208 sends, per step 619, a PS_REQ_CANCEL message to the serving PS. The serving PS releases all resources allocated for the periodic position reporting session. The serving PS sends a PDE_REQ_CANCEL to the original Serving PDE (step 621). The PDE releases all resources allocated for the periodic position reporting session.

In step 623, the Target MS 207 establishes a secure IP connection to the newly assigned target PDE and sends a SUPL_POS to the PDE. The SUPL_POS includes the initial position message (e.g., [TIA-801] message).

In step 625, position messages (e.g., [TIA-801] messages) are exchanged and the Target MS 207's position information is available at the Target MS 207. Each [TIA-801] message is included in a SUPL_POS sent between the Target MS 207 and the target PDE. When the [TIA-801] session is completed, the MS releases all resources related to this position information request. The target PDE sends a PDE_REPORT to the target PS for data recording purposes to indicate the type of [TIA-801] service provided to the MS (step 627). The target PS, as in step 629, sends a PS_REPORT to the home PS 208 for data recording purposes to indicate the type of [TIA-801] service provided to the MS. The periodic position reporting session continues, per step 631.

The scenarios described thus far have involved the home PS 208 determining the target PS and PDE at the mobile node's location within the new domain. However, it is contemplated that the determination can be made at any authorized nodes in the target network; the target network is the mobile node's serving network after the mobile node has moved out of the home network's domain. The authorized node (e.g., the serving PS 209) can function similar to that of the home PS 208 and assign a target PS and PDE for the mobile node, and communicate that to the mobile node. Alternatively, the state associated with the mobile node at that PDE and serving PS may be transferred directly to the target PDE and PS, respectively. The home PS 208 can then be informed of this local shift of state.

According to another embodiment in which decisions regarding the target PS and PDE are made locally, the mobile node, on moving into the new domain, can perform a local lookup to find the new target PS. The mobile node can either inform the home PS 208 requesting it to relocate state to the new PS and PDE, or perform the functions to create state at the target PS and PDE.

The described approaches and arrangements advantageously permits continued reporting of location information when the mobile node enters a new administrative domain.

One of ordinary skill in the art would recognize that the processes of FIGS. 3-6B for supporting periodic tracking across administrative domains may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 7:
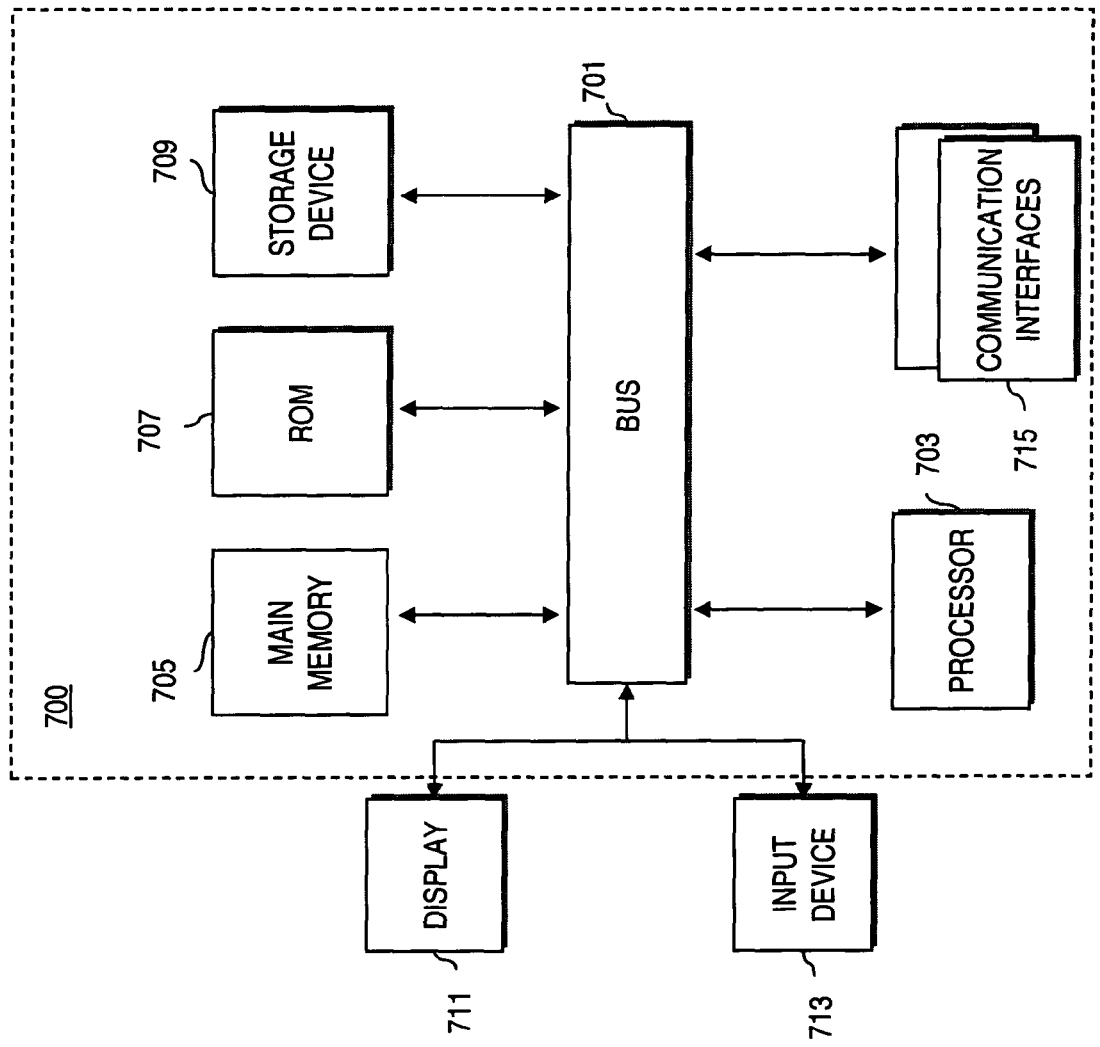
FIG. 7 is a diagram of hardware that can be used to implement an embodiment of the invention.

FIG. 7 illustrates exemplary hardware upon which various embodiments of the invention can be implemented. A computing system 700 includes a bus 701 or other communication mechanism for communicating information and a processor 703 coupled to the bus 701 for processing information. The computing system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computing system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computing system 700 may be coupled via the bus 701 to a display 711, such as a liquid crystal display, or active matrix display, for displaying information to a user. An input device 713, such as a keyboard including alphanumeric and other keys, may be coupled to the bus 701 for communicating information and command selections to the processor 703. The input device 713 can include a cursor control, such as a mouse, a trackball, or cursor direction keys, for communicating direction information and command selections to the processor 703 and for controlling cursor movement on the display 711.

According to one embodiment of the invention, the described processes (such as server processes within the radio access networks) can be provided by the computing system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of, or in combination with, software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 700 also includes at least one communication interface 715 coupled to bus 701. The communication interface 715 provides a two-way data communication coupling to a network link (not shown). The communication interface 715 sends and receives electrical, electromagnetic, or optical signals that carry digital data streams representing various types of information. Further, the communication interface 715 can include peripheral interface devices, such as a Universal Serial Bus (USB) interface, a PCMCIA (Personal Computer Memory Card International Association) interface, etc.

The processor 703 may execute the transmitted code while being received and/or store the code in the storage device 709, or other non-volatile storage for later execution. In this manner, the computing system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8A:
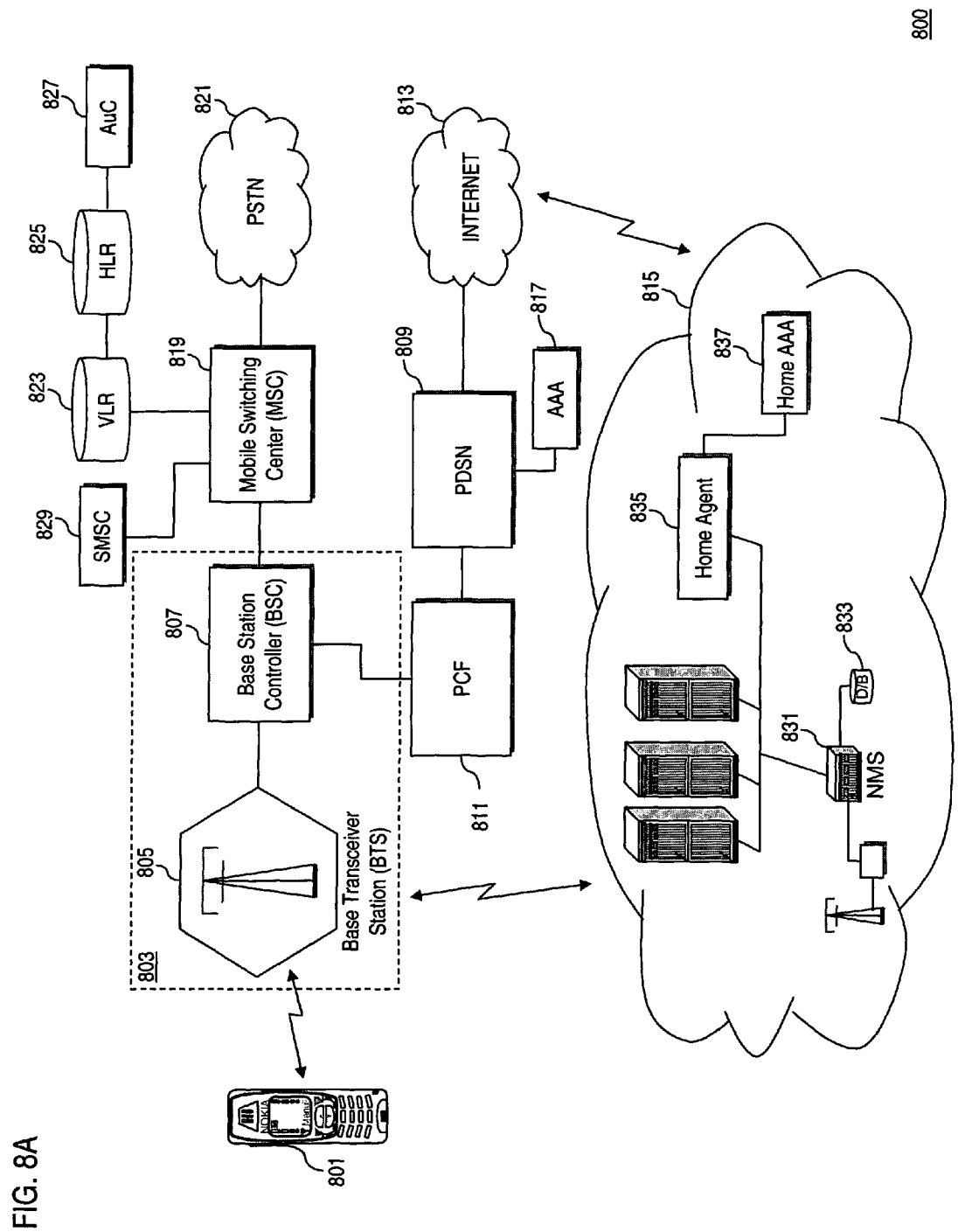
FIGS. 8A and 8B are diagrams of different cellular mobile phone systems capable of supporting various embodiments of the invention.
Figure 8B:
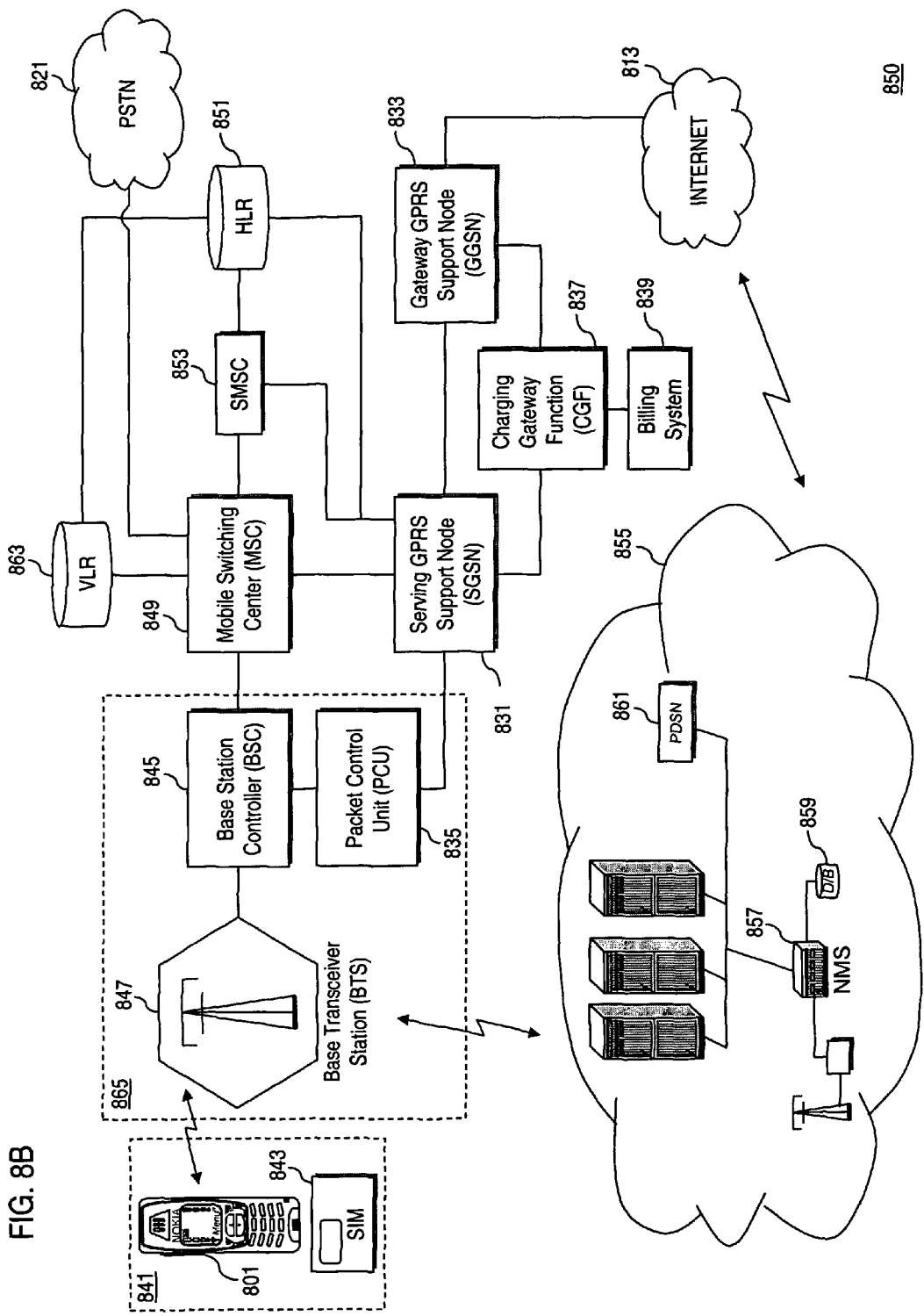

FIGS. 8A and 8B are diagrams of different cellular mobile phone systems capable of supporting various embodiments of the invention. FIGS. 8A and 8B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 800 includes mobile stations 801 (e.g., handsets, terminals, stations, units, devices, or any type of interface to the user (such as "wearable" circuitry, etc.)) in communication with a Base Station Subsystem (BSS) 803. According to one embodiment of the invention, the radio network supports Third Generation (3G) services as defined by the International Telecommunications Union (ITU) for International Mobile Telecommunications 2000 (IMT-2000).

In this example, the BSS 803 includes a Base Transceiver Station (BTS) 805 and Base Station Controller (BSC) 807. Although a single BTS is shown, it is recognized that multiple BTSs are typically connected to the BSC through, for example, point-to-point links. Each BSS 803 is linked to a Packet Data Serving Node (PDSN) 809 through a transmission control entity, or a Packet Control Function (PCF) 811. Since the PDSN 809 serves as a gateway to external networks, e.g., the Internet 813 or other private consumer networks 815, the PDSN 809 can include an Access, Authorization and Accounting system (AAA) 817 to securely determine the identity and privileges of a user and to track each user's activities. The network 815 comprises a Network Management System (NMS) 831 linked to one or more databases 833 that are accessed through a Home Agent (HA) 835 secured by a Home AAA 837.

Although a single BSS 803 is shown, it is recognized that multiple BSSs 803 are typically connected to a Mobile Switching Center (MSC) 819. The MSC 819 provides connectivity to a circuit-switched telephone network, such as the Public Switched Telephone Network (PSTN) 821. Similarly, it is also recognized that the MSC 819 may be connected to other MSCs 819 on the same network 800 and/or to other radio networks. The MSC 819 is generally collocated with a Visitor Location Register (VLR) 823 database that holds temporary information about active subscribers to that MSC 819. The data within the VLR 823 database is to a large extent a copy of the Home Location Register (HLR) 825 database, which stores detailed subscriber service subscription information. In some implementations, the HLR 825 and VLR 823 are the same physical database; however, the HLR 825 can be located at a remote location accessed through, for example, a Signaling System Number 7 (SS7) network. An Authentication Center (AuC) 827 containing subscriber-specific authentication data, such as a secret authentication key, is associated with the HLR 825 for authenticating users. Furthermore, the MSC 819 is connected to a Short Message Service Center (SMSC) 829 that stores and forwards short messages to and from the radio network 800.

During typical operation of the cellular telephone system, BTSs 805 receive and demodulate sets of reverse-link signals from sets of mobile units 801 conducting telephone calls or other communications. Each reverse-link signal received by a given BTS 805 is processed within that station. The resulting data is forwarded to the BSC 807. The BSC 807 provides call resource allocation and mobility management functionality including the orchestration of soft handoffs between BTSs 805. The BSC 807 also routes the received data to the MSC 819, which in turn provides additional routing and/or switching for interface with the PSTN 821. The MSC 819 is also responsible for call setup, call termination, management of inter-MSC handover and supplementary services, and collecting, charging and accounting information. Similarly, the radio network 800 sends forward-link messages. The PSTN 821 interfaces with the MSC 819. The MSC 819 additionally interfaces with the BSC 807, which in turn communicates with the BTSs 805, which modulate and transmit sets of forward-link signals to the sets of mobile units 801.

As shown in FIG. 8B, the two key elements of the General Packet Radio Service (GPRS) infrastructure 850 are the Serving GPRS Supporting Node (SGSN) 831 and the Gateway GPRS Support Node (GGSN) 833. In addition, the GPRS infrastructure includes a Packet Control Unit (PCU) 835 and a Charging Gateway Function (CGF) 837 linked to a Billing System 839. Furthermore, in GPRS the Mobile Station (MS) 841 is composed of two parts—the mobile station 801 itself and the Subscriber Identity Module (SIM) 843—which is a small card within the station 801 containing an integrated circuit.

The PCU 835 is a logical network element responsible for GPRS-related functions such as air interface access control, packet scheduling on the air interface, and packet assembly and re-assembly. Generally the PCU 835 is physically integrated with the BSC 845; however, it can be collocated with a BTS 847 or a SGSN 831. The SGSN 831 provides equivalent functions as the MSC 849 including mobility management, security, and access control functions but in the packet-switched domain. Furthermore, the SGSN 831 has connectivity with the PCU 835 through, for example, a Fame Relay-based interface using the BSS GPRS protocol (BSSGP). Although only one SGSN is shown, it is recognized that that multiple SGSNs 831 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 845, any given BSC 845 generally interfaces with one SGSN 831. Also, the SGSN 831 is optionally connected with the HLR 851 through an SS7-based interface using GPRS enhanced Mobile Application Part (MAP) or with the MSC 849 through an SS7-based interface using Signaling Connection Control Part (SCCP). The SGSN/HLR interface allows the SGSN 831 to provide location updates to the HLR 851 and to retrieve GPRS-related subscription information within the SGSN service area. The SGSN/MSC interface enables coordination between circuit-switched services and packet data services such as paging a subscriber for a voice call. Finally, the SGSN 831 interfaces with a SMSC 853 to enable short messaging functionality over the network 850.

The GGSN 833 is the gateway to external packet data networks, such as the Internet 813 or other private customer networks 855. The network 855 comprises a Network Management System (NMS) 857 linked to one or more databases 859 accessed through a PDSN 861. The GGSN 833 assigns Internet Protocol (IP) addresses and can also authenticate users acting as a Remote Authentication Dial-In User Service host. Firewalls located at the GGSN 833 also perform a firewall function to restrict unauthorized traffic. Although only one GGSN 833 is shown, it is recognized that a given SGSN 831 may interface with one or more GGSNs 833 to allow user data to be tunneled between the two entities as well as to and from the network 850. When external data networks initialize sessions over the GPRS network 850, the GGSN 833 queries the HLR 851 for the SGSN 831 currently serving a MS 841.

The BTS 847 and BSC 845 manage the radio interface, including controlling which Mobile Station (MS) 841 has access to the radio channel at what time. These elements essentially relay messages between the MS 841 and SGSN 831. The SGSN 831 manages communications with an MS 841, sending and receiving data and keeping track of its location. The SGSN 831 also registers the MS 841, authenticates the MS 841, and encrypts data sent to the MS 841.

Figure 9:
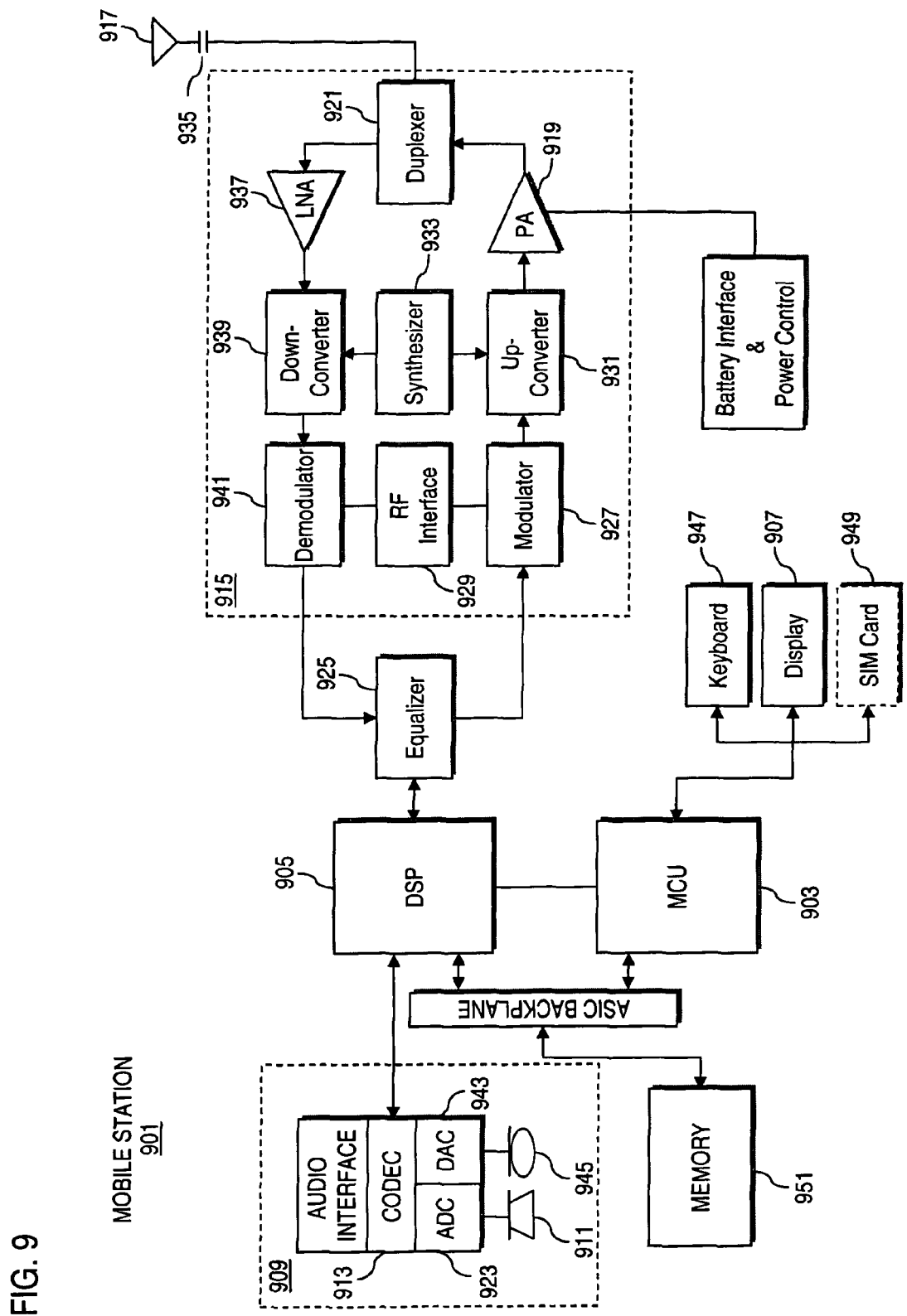
FIG. 9 is a diagram of exemplary components of a mobile station capable of operating in the systems of FIGS. 8A and 8B, according to an embodiment of the invention.

FIG. 9 is a diagram of exemplary components of a mobile station (e.g., handset) capable of operating in the systems of FIGS. 8A and 8B, according to an embodiment of the invention. Generally, a radio receiver is often defined in terms of front-end and back-end characteristics. The front-end of the receiver encompasses all of the Radio Frequency (RF) circuitry whereas the back-end encompasses all of the baseband processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system (e.g., systems of FIG. 8A or 8B), via antenna 917. The power amplifier (PA) 919 and the transmitter/modulation circuitry are operationally responsive to the MCU 903, with an output from the PA 919 coupled to the duplexer 921 or circulator or antenna switch, as known in the art.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The MCU 903 delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While various embodiments of the invention have been described in connection with a number of embodiments and implementations, the invention is not so limited but covers various obvious modifications and equivalent arrangements. Also, the many features associated with these embodiments can be practiced in number of combinations and order.

What is claimed is:

1. A method comprising:
   detecting departure from a first administrative domain during a position reporting session;
   determining whether a first entity, configured to determine position, within the first administrative domain is inaccessible; and
   if inaccessible, initiating signaling for a handoff for assignment of a second entity, configured to determine position, within a second administrative domain to continue the position reporting session.

2. A method according to claim 1, further comprising:
   establishing of a secure connection to a home position server; and
   sending a secure user plane start message to re-initiate the position reporting session.

3. A method according to claim 2, wherein the secure user plane start message in the sending step specifies a mobile station identifier, a location service correlation identifier, a quality of position parameter, a duration parameter, current serving system information, or a positioning mode parameter.

4. A method according to claim 2, wherein the home position server sends a cancel request message to a serving position server of the first administrative domain.

5. A method according to claim 2, wherein the home position server sends a cancel request message to the first entity of the first administrative domain.

6. A method according to claim 1, wherein the home position server formulates a fully qualified domain name for a target position server if the home position server does not have a network address of the target position server corresponding to the second administrative domain.

7. A method according to claim 6, wherein the home position server establishes a secure connection to the target position server and sends position server request message over the secure connection.

8. A method according to claim 7, wherein the target position server verifies that the position server request message is from an authorized entity.

9. A method according to claim 7, wherein the target position server returns address information of the second entity to the home position server.

10. A method according to claim 9, further comprising:
    receiving the address information from the home position server; and
    establishing a secure connection to the second entity according to the address information.

11. A method according to claim 6, wherein the second entity sends a entity Report message to the target position server for recording of data relating to type of service.

12. A method according to claim 6, wherein the target position server sends a position server report message to the home position server for recording of data relating to type of service.

13. A method according to claim 1, wherein the administrative domains are associated with different cellular systems, and each of the first entity and the second entity is a position determining entity (PDE).

14. A method according to claim 13, wherein the different cellular systems include spread spectrum systems.

15. A method according to claim 1, wherein the first entity and the second entity operate according to an Internet Protocol (IP)-based location service infrastructure reference model.

16. A method according to claim 1, wherein the position reporting session corresponds to either a periodic session for tracking a mobile station, a one-time session for tracking the mobile station, or a conditional session for tracking the mobile station.

17. An apparatus comprising:
    a processor configured to detect departure from a first administrative domain during a position reporting session, and to determine whether a first entity, configured to determine position, within the first administrative domain is inaccessible; and
    a radio section coupled to the processor and configured to initiate signaling for a handoff for assignment of a second entity if the first entity is inaccessible, wherein the second entity is configured to determine position, within a second administrative domain to continue the position reporting session.

18. An apparatus according to claim 17, wherein a secure connection is established to a home position server, and the processor generates a secure user plane start message to re-initiate the position reporting session.

19. A method comprising:
receiving a message, from a mobile node, specifying information corresponding to a tracking session, upon the mobile node entering a new administrative domain from another administrative domain;
identifying a new serving position server within the new administrative domain for serving the mobile node; and
assigning a new position determining entity (PDE) within the new administrative domain for continuing the session in the new administrative domain.

20. A method according to claim 19, wherein a position determining entity (PDE) within the other administrative domain has a private address.

21. A method according to claim 20, wherein a position determining entity (PDE) within the other administrative domain forwards an error message to the mobile node indicating entry into the new administrative domain.

22. A method according to claim 20, wherein the identifying and assigning steps are performed by an authorized node that is authorized to communicate with the mobile node.

23. A method according to claim 22, wherein the authorized node includes a home position server.

24. A method according to claim 22, wherein the authorized node is within the new administrative domain.

25. A method according to claim 19, wherein the mobile node determines the new serving position server.

26. A method according to claim 19, wherein the administrative domains are associated with different cellular systems.

27. A method according to claim 19, wherein the different cellular systems include spread spectrum systems.

28. A method according to claim 19, wherein the new PDE operates according to an Internet Protocol (IP)-based location service infrastructure reference model.

29. A method according to claim 19, wherein the position reporting session corresponds to either a periodic session for tracking a mobile station, a one-time session for tracking the mobile station, or a conditional session for tracking the mobile station.

30. An apparatus comprising:
a communication interface configured to receive a message, from a mobile node, specifying information corresponding to a tracking session, upon the mobile node entering a new administrative domain from another administrative domain; and
a processor coupled to the communication interface and configured to identify a new serving position server within the new administrative domain for serving the mobile node, the processor being further configured to assign a new position determining entity (PDE) within the new administrative domain for continuing the session in the new administrative domain.

31. An apparatus according to claim 30, wherein a position determining entity (PDE) within the other administrative domain has a private address.

32. An apparatus according to claim 31, wherein a position determining entity (PDE) within the other administrative domain forwards an error message to the mobile node indicating entry into the new administrative domain.

33. An apparatus according to claim 30, wherein the mobile node determines the new serving position server.

34. An apparatus according to claim 30, wherein the administrative domains are associated with different cellular systems.

35. An apparatus according to claim 30, wherein the different cellular systems include spread spectrum systems.

36. An apparatus according to claim 30, wherein the new PDE operates according to an Internet Protocol (IP)-based location service infrastructure reference model.

37. A communication system comprising the apparatus of claim 30.

38. An apparatus comprising:
means for detecting departure from a first administrative domain during a position reporting session;
means for determining whether a first entity, configured to determine position, within the first administrative domain is inaccessible; and
means for, if inaccessible, initiating signaling for a handoff for assignment of a second entity, configured to determine position, within a second administrative domain to continue the position reporting session.

39. An apparatus according to claim 38, further comprising:
means for establishing of a secure connection to a home position server; and
means for sending a secure user plane start message to re-initiate the position reporting session.

40. An apparatus comprising:
means for receiving a message, from a mobile node, specifying information corresponding to a tracking session, upon the mobile node entering a new administrative domain from another administrative domain;
means for identifying a new serving position server within the new administrative domain for serving the mobile node; and
means for assigning a new position determining entity (PDE) within the new administrative domain for continuing the session in the new administrative domain.

41. An apparatus according to claim 40, wherein a position determining entity (PDE) within the other administrative domain has a private address.

42. A system comprising:
a node configured to receive a message, from a mobile node, specifying information corresponding to a tracking session, upon the mobile node entering a new administrative domain from another administrative domain; and
a position determining entity (PDE) configured to determine location of the mobile node within the other administrative domain and to communicate with the node,
wherein the node is further configured to identify a new serving position server within the new administrative domain for serving the mobile node, and to assign a new position determining entity (PDE) within the new administrative domain for continuing the session in the new administrative domain.

43. A system according to claim 42, wherein the administrative domains are associated with cellular networks operated by different service providers.

44. An apparatus comprising:
a processor configured to detect departure from a first administrative domain during a position reporting session, and to determine whether a first entity, configured to determine position, within the first administrative domain is inaccessible,
wherein signaling is initiated for a handoff for assignment of a second entity if the first entity is inaccessible, and the second entity is configured to determine position, within a second administrative domain to continue the position reporting session.

45. An apparatus according to claim 44, wherein a secure connection is established to a home position server, and the processor generates a secure user plane start message to re-initiate the position reporting session.

46. An apparatus according to claim 45, wherein the secure user plane start message specifies a mobile station identifier, a location service correlation identifier, a quality of position parameter, a duration parameter, current serving system information, or a positioning mode parameter.

47. An apparatus according to claim 45, wherein the home position server sends a cancel request message to a serving position server of the first administrative domain.

48. An apparatus according to claim 45, wherein the home position server sends a cancel request message to the first entity of the first administrative domain.

49. An apparatus according to claim 44, wherein the home position server formulates a fully qualified domain name for a target position server if the home position server does not have a network address of the target position server corresponding to the second administrative domain.

50. An apparatus according to claim 49, wherein the home position server establishes a secure connection to the target position server and sends position server request message over the secure connection.

51. An apparatus according to claim 50, wherein the target position server verifies that the position server request message is from an authorized entity.

52. An apparatus according to claim 50, wherein the target position server returns address information of the second entity to the home position server.

53. An apparatus according to claim 52, wherein the processor is further configured to receive the address information from the home position server, and to initiate establishment of a secure connection to the second entity according to the address information.

54. An apparatus according to claim 49, wherein the second entity sends a entity Report message to the target position server for recording of data relating to type of service.

55. An apparatus according to claim 49, wherein the target position server sends a position server report message to the home position server for recording of data relating to type of service.

56. An apparatus according to claim 44, wherein the administrative domains are associated with different cellular systems, and each of the first entity and the second entity is a position determining entity (PDE).

57. An apparatus according to claim 56, wherein the different cellular systems include spread spectrum systems.

58. An apparatus according to claim 44, wherein the first entity and the second entity operate according to an Internet Protocol (IP)-based location service infrastructure reference model.

59. An apparatus according to claim 44, wherein the position reporting session corresponds to either a periodic session for tracking a mobile station, a one-time session for tracking the mobile station, or a conditional session for tracking the mobile station.

* * * * *